(12) United States Patent
Weissenmayer et al.

(10) Patent No.: US 10,859,397 B2
(45) Date of Patent: Dec. 8, 2020

(54) METHOD AND DEVICE FOR CREATING A MAP

(71) Applicant: Robert Bosch GmbH, Stuttgart (DE)

(72) Inventors: Simon Weissenmayer, Flein (DE); Timo Koenig, Unterheinriet (DE); Erik Lesser, Steinheim (DE); Markus Dressel, Veilsdorf (DE); Peter Buchner, Grosserlach (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 16/133,194

(22) Filed: Sep. 17, 2018

(65) Prior Publication Data
US 2019/0086230 A1    Mar. 21, 2019

(30) Foreign Application Priority Data
Sep. 19, 2017 (DE) .................. 10 2017 216 584

(51) Int. Cl.
| | | |
|---|---|---|
| *G01C 21/36* | (2006.01) | |
| *G06F 16/29* | (2019.01) | |
| *G01C 21/32* | (2006.01) | |
| *G06T 17/05* | (2011.01) | |

(52) U.S. Cl.
CPC ......... *G01C 21/3694* (2013.01); *G01C 21/32* (2013.01); *G01C 21/3626* (2013.01); *G06F 16/29* (2019.01); *G06T 17/05* (2013.01); *G06T 2207/30252* (2013.01)

(58) Field of Classification Search
CPC ............... G01C 21/3694; G01C 21/32; G01C 21/3626; G06F 16/29; G06T 17/05; G06T 2207/30252
See application file for complete search history.

(56) References Cited

U.S. PATENT DOCUMENTS

| | | | |
|---|---|---|---|
| 9,863,928 B1 | 1/2018 | Peterson et al. | |
| 2011/0112762 A1* | 5/2011 | Gruijters | G01C 21/32 |
| | | | 701/532 |
| 2011/0224901 A1* | 9/2011 | Aben | G01C 21/32 |
| | | | 701/532 |
| 2013/0018575 A1 | 1/2013 | Birken et al. | |
| 2013/0293716 A1 | 11/2013 | Breed | |
| 2016/0176408 A1 | 6/2016 | Lynch | |
| 2017/0254665 A1* | 9/2017 | Bai | G01C 21/32 |
| 2017/0328722 A1* | 11/2017 | Serbanescu | G01C 21/32 |

FOREIGN PATENT DOCUMENTS

| | | |
|---|---|---|
| DE | 102013202521 A1 | 8/2014 |
| DE | 102014213424 A1 | 1/2016 |
| DE | 102017118179 A1 | 2/2018 |

OTHER PUBLICATIONS

Joseph, Angelo, Measuring GNSS Signal Strength, Dec. 2, 2010, Inside GNSS, Nov./Dec. 2010 (Year: 2010).*

\* cited by examiner

*Primary Examiner* — Rami Khatib
(74) *Attorney, Agent, or Firm* — Norton Rose Fulbright US LLP; Gerard Messina

(57) ABSTRACT

A method and a device are described for creating a map, including a step of receiving a signal, the signal representing a determination of the position of a vehicle in an area, and the signal including an analysis of the position determination, a step of determining a surface state in the area, based on the analysis and as a function of the position determination, a step of creating a map based on the surface state, the map representing at least the area, and a step of providing the map.

8 Claims, 3 Drawing Sheets

METHOD AND DEVICE FOR CREATING A MAP

FIELD OF THE INVENTION

The present invention relates to a method and a device for creating a map, including a step of receiving a signal, the signal representing a determination of the position of a vehicle in an area, and the signal including an analysis of the position determination, and a step of determining a surface state in the area, based on the analysis and as a function of the position determination.

The method also includes a step of creating a map based on the surface state, the map representing at least the area, and a step of providing the map.

SUMMARY

The method according to the present invention for creating a map includes a step of receiving a signal, the signal representing a determination of the position of a vehicle in an area, and the signal including an analysis of the position determination, and a step of determining a surface state in the area, based on the analysis and as a function of the position determination. The method also includes a step of creating a map based on the surface state, the map representing at least the area, and a step of providing the map.

A map is understood to mean a digital map that is present in the form of (map) data values on a memory medium. The map is designed, for example, in such a way that one or multiple map layers are encompassed, one map layer showing, for example, a map from a bird's-eye view (course and position of streets, buildings, landscape features, etc.). This corresponds to a map of a navigation system, for example. A further map layer includes a radar map, for example, the surroundings data values that are encompassed by the radar map being stored with a radar signature. A further map layer includes, for example, a LIDAR map, the surroundings data values that are encompassed by the LIDAR map being stored with a LIDAR signature. A further map layer includes, for example, surface states for example in the form of (physical) friction coefficients and/or in the form of a description of the state (wet, dry, slick, slippery, etc.).

The method according to the present invention advantageously achieves the object of creating and providing a map that includes in particular instantaneous information about a surface state, since the surface state, for example a roadway, has a great influence on the safety of a vehicle or the occupants of the vehicle, and the surface state may change greatly, sometimes within small distances (several meters).

The creation of the map preferably takes place by supplementing an existing map with the surface state in the area.

This yields the advantage that the first map may be created in a quick and resource-conserving manner, since map material that is already present in the form of at least one existing map may be used.

The provision of the map preferably takes place in such a way that the vehicle and/or at least one other vehicle are/is operated as a function of the map.

An operation of the vehicle and/or of the at least one other vehicle is understood to mean, for example, that the surface state is displayed to an operator (driver and/or occupant) on a navigation system and/or a smart phone and/or some other display unit that in each case are/is encompassed by the particular vehicle and/or are/is connected to the particular vehicle. In one specific embodiment, an operation of the vehicle and/or of the at least one other vehicle, in particular when they are designed as automated vehicles, is understood to mean, for example, that an actuation of the transverse and/or longitudinal control is carried out as a function of the first map. In another specific embodiment, an operation is understood to mean, for example, that safety-relevant functions for maintaining and/or enhancing the safety of the particular vehicle and/or of at least one occupant of the particular vehicle are carried out, and/or provided as a function of the map ("arming" an airbag, buckling a seat belt, etc.).

This yields the advantage that the map results in overall enhancement of the safety of the particular vehicle and/or of the traffic and the road users.

The determination of the surface state preferably takes place by making a comparison of the analysis to at least one reference analysis, and/or making the comparison as a function of the time of day and/or time of year of the position determination, and/or detecting an instantaneous temperature of the area.

This yields the advantage that instantaneous states of the surroundings of the area, such as temperature, time of day, and time of year, which may have a significant influence on a surface state, are likewise taken into account, which greatly reduces errors that may occur in the map, thus enhancing safety.

The analysis of the position determination preferably takes place by determining an intensity of a locating signal that is detected for determining the position of the vehicle.

An analysis is understood to mean, for example, that an intensity of a locating signal, in particular a GPS signal that is received with the aid of a GNSS unit, is measured. In addition, for example, an intensity of the GPS signal that is detected not directly by the vehicle, but instead indirectly via multipath reception, is measured. The multipath reception occurs when electromagnetic waves, in the present case the GPS signal, are deflected by reflectors (buildings, wet roadway surfaces, wet foliage, etc.) and are thus received via multiple paths, not directly.

A reference analysis is understood to mean, for example, an analysis that under certain conditions has been carried out in advance and thus provides reference values, on the basis of which the analysis may be carried out by comparison. In one specific embodiment, the reference analysis represents, for example, a maximum and/or a minimum intensity of a locating signal and/or of a GPS signal that are/is detected indirectly via multipath reception.

This yields the advantage that sources of error that occur, which happen anyway with the detection of the locating signal, are intentionally taken into account and evaluated in order to draw conclusions concerning the surface state. This makes the method very effective and cost-efficient.

The device according to the present invention for creating a map includes first means for receiving a signal, the signal representing a determination of the position of a vehicle in an area, and the signal including an analysis of the position determination, and second means for determining a surface state in the area, based on the analysis and as a function of the position determination. In addition, the device includes third means for creating a map based on the surface state, the map representing at least the area, and fourth means for providing the map.

The first means and/or the second means and/or the third means and/or the fourth means are/is preferably designed for carrying out a method.

DETAILED DESCRIPTION

Figure 1:
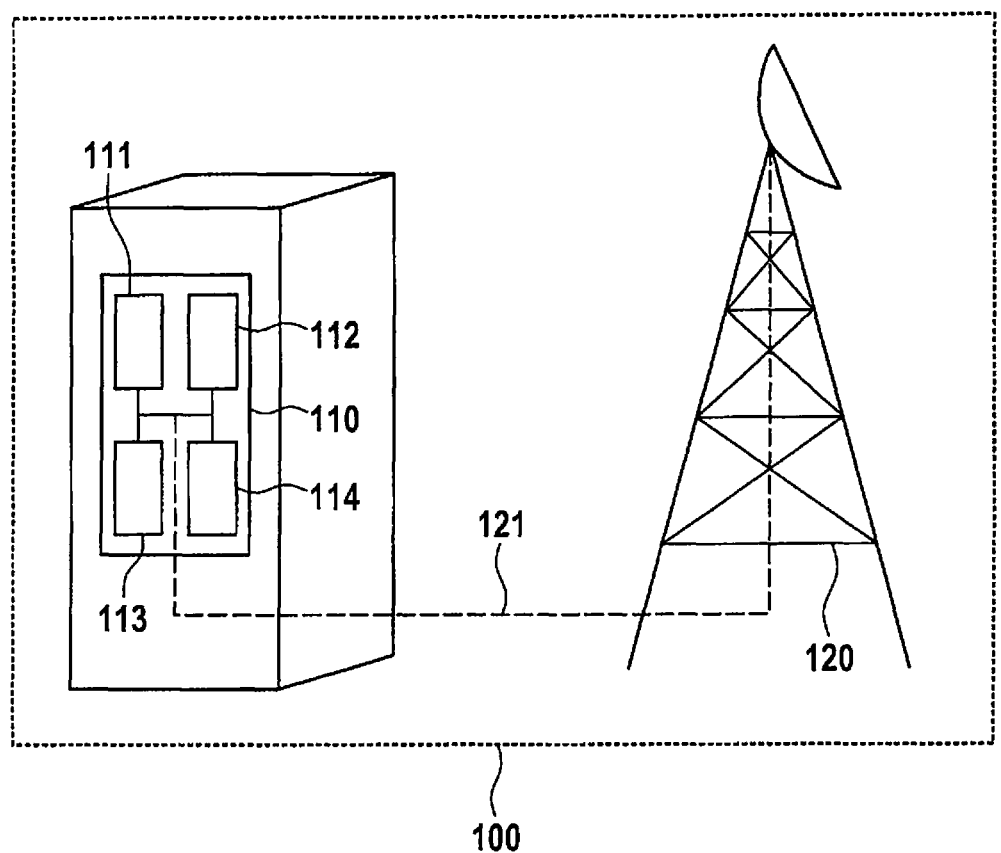
FIG. 1 shows a first exemplary embodiment of the device according to the present invention.

FIG. 1 shows a processing unit 100, illustrated by way of example, that includes a device 110 for creating 330 a map. A processing unit 100 is understood to mean a server, for example. In another specific embodiment, a processing unit 100 is understood to mean a cloud, i.e., a combination of at least two electronic data processing systems that exchange data with the aid of the Internet, for example. In another specific embodiment, processing unit 100 corresponds to device 110.

Device 110 includes first means 111 for receiving 310 a signal, the signal representing a determination of the position of a vehicle 200 in an area, and the signal including an analysis of the position determination, and second means 112 for determining 320 a surface state in the area, based on the analysis and as a function of the position determination. Device 110 also includes third means 113 for creating 330 a map based on the surface state, the map representing at least the area, and fourth means 114 for providing 340 the map.

First means 111 and/or second means 112 and/or third means 113 and/or fourth means 114 may likewise be provided in different specific embodiments, as a function of the particular specific embodiment of processing unit 100. If processing unit 100 is designed as a server, first means 111 and/or second means 112 and/or third means 113 and/or fourth means 114 are/is localized at the same location, based on the location of device 110.

If processing unit 100 is designed as a cloud, first means 111 and/or second means 112 and/or third means 113 and/or fourth means 114 may be localized in different locations, for example in different cities and/or in different countries, a connection such as the Internet being provided for exchanging (electronic) data between first means 111 and/or second means 112 and/or third means 113 and/or fourth means 114.

First means 111 are designed for receiving a signal, the signal representing a determination of the position of a vehicle 200 in an area, and the signal including an analysis of the position determination. For this purpose, first means 111 are designed as a receiving unit and/or transmitting unit with the aid of which data are requested and/or received. In another specific embodiment, first means 111 are designed in such a way that they are connected, starting from device 110, to an externally situated transmitting and/or receiving unit 122 with the aid of a wired and/or wireless connection 121. In addition, first means 111 include electronic data processing elements such as a processor, a working memory, and a hard disk, that are designed for storing and/or processing the signal, for example changing and/or adapting the data format and subsequently relaying to second means 112. In another specific embodiment, first means 111 are designed for relaying the received signal, without data processing elements, to second means 112.

In addition, the device includes second means 112 that are designed for determining a surface state in the area, based on the analysis and as a function of the position determination. This takes place, for example, by making a comparison of the analysis to at least one reference analysis, and/or making the comparison as a function of the time of day and/or time of year of the position determination, and/or detecting an instantaneous temperature of the area. For this purpose, second means 112 are designed as a processing unit, for example, that includes electronic data processing elements such as a processor, a working memory, and a hard disk. In addition, second means 112 include appropriate software that is designed for determining the surface state. In one specific embodiment, second means 112 include, for example, transmitting means and/or receiving means for querying the instantaneous temperature of the area from an appropriate weather service. In another specific embodiment, the transmitting means and/or receiving means are/is identical to the transmitting means and/or receiving means of first means 111 and/or of fourth means 114. In one specific embodiment, determination 320 of the surface state takes place, for example, by determining the surface state as a function of the intensity of the locating signal and/or the instantaneous temperature and/or the time of day and/or the time of year and/or the position determination (or a position thus determined).

In addition, device 110 includes third means 113 that are designed for creating the map based on the surface state, the map representing at least the area. For this purpose, third means 113 are designed as a processing unit, for example, that includes electronic data processing elements such as a processor, a working memory, and a hard disk. In addition, third means 113 include appropriate software that is designed for creating the map based on the surface state. Creation 330 of the map takes place, for example, by supplementing an existing map with the surface state in the area. In one specific embodiment, the existing map is stored on the hard disk, for example. In another specific embodiment, the existing map is requested and received from a map provider with the aid of transmitting means and/or receiving means, which may be identical to the transmitting means and/or receiving means of first means 111 and/or of second means 112 and/or of fourth means 114. In one specific embodiment, the map is created, for example, by adding an additional map layer, which includes the surface state in the area, to the existing map, based on the area.

In addition, device 110 includes fourth means 114 for providing 340 the map. For this purpose, fourth means 114 include a receiving unit and/or transmitting unit with the aid of which data are requested and/or received. In another specific embodiment, fourth means 114 are designed in such a way that they are connected, starting from device 110, to an externally situated transmitting and/or receiving unit 122 with the aid of a wired and/or wireless connection 121. In another specific embodiment, the transmitting means and/or receiving means are/is identical to the transmitting means and/or receiving means of first means 111. In addition, fourth means 114 include electronic data processing elements such as a processor, a working memory, and a hard disk, that are designed for processing the map in the form of data values, for example to change and/or adapt the data format and subsequently provide same as a map. In one specific embodiment, fourth means 111 are designed for providing the map in such a way that the map may be received by vehicle 200 and/or by at least one other vehicle, and that vehicle 200 and/or the at least one other vehicle are/is operated as a function of the map.

Figure 2:
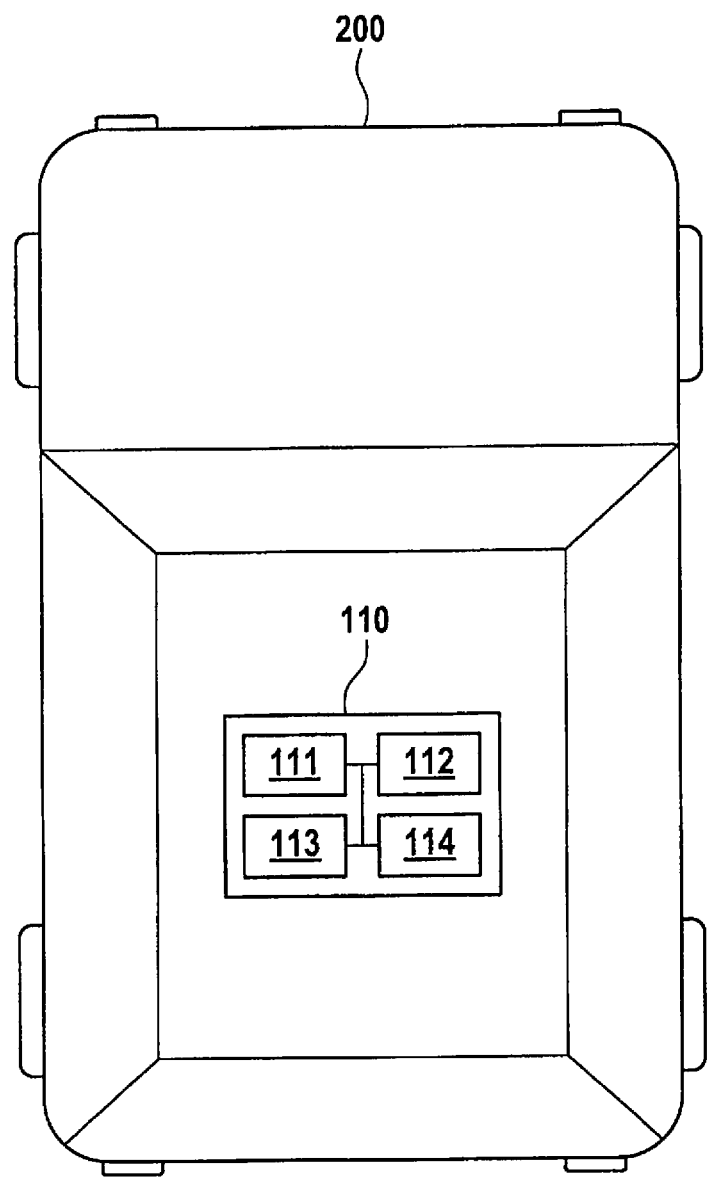
FIG. 2 shows a second exemplary embodiment of the device according to the present invention.

FIG. 2 shows a vehicle 200 that includes device 110 according to the present invention.

Device 110 includes first means 111 for receiving 310 a signal, the signal representing a determination of the position of a vehicle 200 in an area, and the signal including an analysis of the position determination, and second means 112 for determining 320 a surface state in the area, based on the analysis and as a function of the position determination.

Device 110 also includes third means 113 for creating 330 a map based on the surface state, the map representing at least the area, and fourth means 114 for providing 340 the map.

First means 111 are designed for receiving a signal, the signal representing a determination of the position of a vehicle 200 in an area, and the signal including an analysis of the position determination. For this purpose, first means 111 are designed, for example, as a data interface in such a way that the signal, starting from a navigation system and/or a smart phone that is encompassed by vehicle 200 and that is connected to the vehicle with the aid of a wired and/or wireless connection, is transmitted and received with the aid of first means 111. In addition, the data interface is designed for relaying the received signal to second means 112.

Second means 112 are designed for determining a surface state in the area, based on the analysis and as a function of the position determination. For this purpose, second means 112 are designed as a processing unit, for example, that includes electronic data processing elements such as a processor, a working memory, and a hard disk. In addition, second means 112 include appropriate software that is designed for determining the surface state. In one specific embodiment, second means 112 correspond to second means 112 as described in the description of the figures for FIG. 1. The transmitting means and/or receiving means for querying the instantaneous temperature and/or the time of day and/or the time of year correspond(s), for example, to a multimedia unit and/or the smart phone that are/is encompassed by the vehicle.

In addition, device 110 includes third means 113 that are designed for creating the map based on the surface state, the map representing at least the area. For this purpose, third means 113 are designed as a processing unit, for example, that includes electronic data processing elements such as a processor, a working memory, and a hard disk. In addition, third means 113 include appropriate software that is designed for creating the map based on the surface state. Creation 330 of the map takes place, for example, by supplementing an existing map with the surface state in the area. In one specific embodiment, the one existing map is stored on the hard disk, for example. In another specific embodiment, the existing map is requested and received from a map provider with the aid of transmitting means and/or receiving means, which may be identical to the transmitting means and/or receiving means of first means 111 and/or of second means 112 and/or of fourth means 114. In one specific embodiment, the map is created, for example, by adding an additional map layer, which includes the surface state in the area, to the existing map, based on the area.

In addition, device 110 includes fourth means 114 for providing 340 the map. For this purpose, fourth means 114 include a receiver unit and/or transmitter unit with the aid of which data are requested and/or received. In another specific embodiment, the transmitting means and/or receiving means are/is identical to the transmitting means and/or receiving means of first means 111 and/or second means 112 and/or third means 113. In addition, fourth means 114 include electronic data processing elements such as a processor, a working memory, and a hard disk, that are designed for processing the map in the form of data values, for example to change and/or adapt the data format and subsequently relay same as a map. In one specific embodiment, fourth means 114 are designed for providing the map in such a way that the map may be received by vehicle 200 and/or by at least one other vehicle, and that vehicle 200 and/or the at least one other vehicle are/is operated as a function of the map. In one specific embodiment, fourth means 114 are designed as a data interface, with the aid of which the map may be provided or transmitted to a navigation system and/or to the smart phone and/or to a control unit of vehicle 200.

Figure 3:
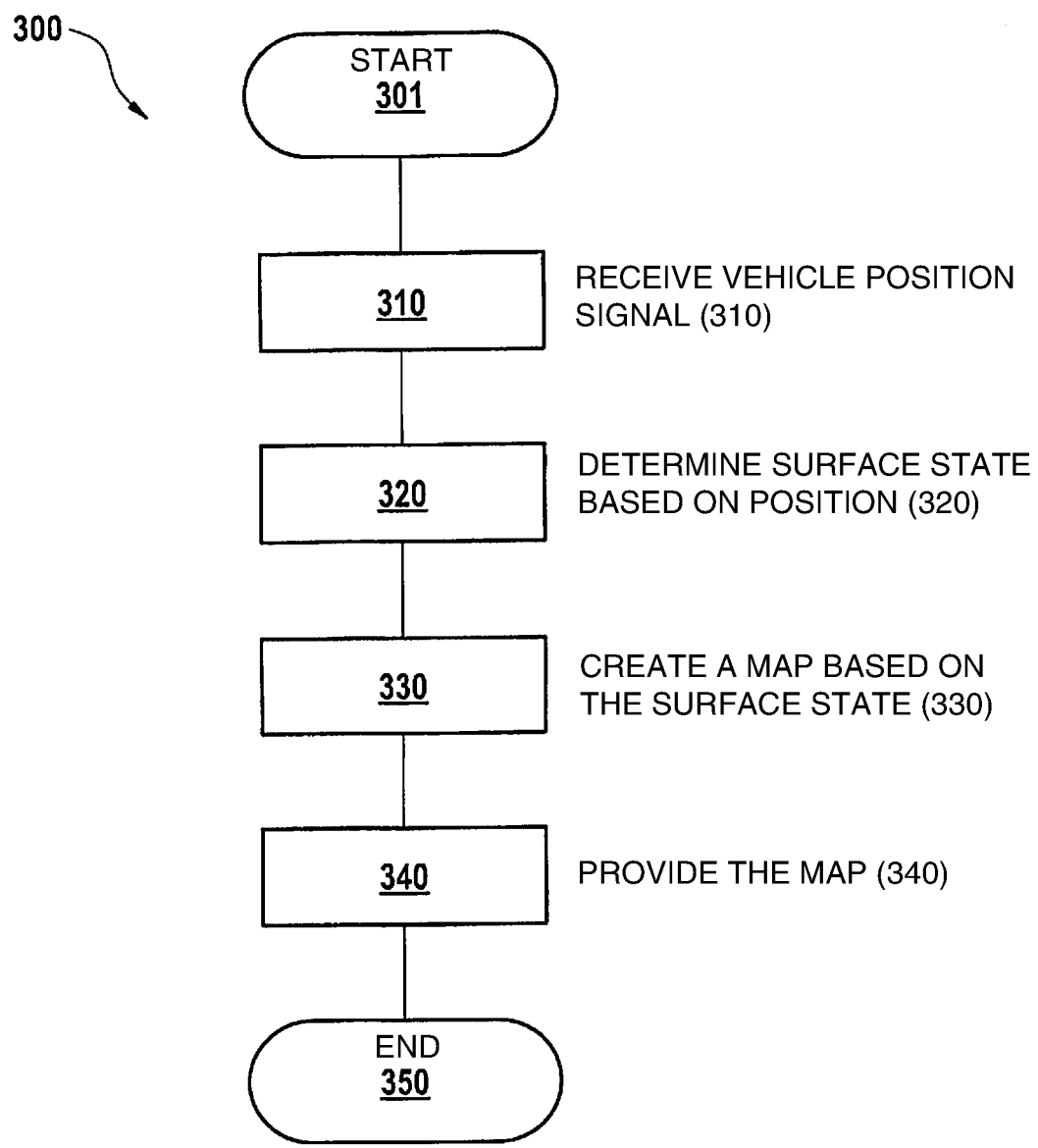
FIG. 3 shows an exemplary embodiment of the method according to the present invention in the form of a flow chart.

FIG. 3 shows one exemplary embodiment of a method 300 for creating 330 a map.

Method 300 starts in step 301.

A signal is received in step 310, the signal representing a determination of the position of a vehicle in an area, and the signal including an analysis of the position determination.

A surface state in the area is determined, based on the analysis and as a function of the position determination, in step 320.

A map is created, based on the surface state, in step 330, the map representing at least the area.

The map is provided in step 340.

Method 300 ends in step 350.

What is claimed is:

1. A method for creating a map, the method comprising:
   receiving a signal representing a position determination of a vehicle in an area and including an analysis of the position determination;
   determining a surface state in the area based on the analysis and as a function of the position determination;
   creating a map based on the surface state, the map representing at least the area; and
   providing the map;
   wherein the determining of the surface includes at least one of:
      performing a comparison of the analysis to at least one reference analysis,
      performing the comparison as a function of at least one of a time of day and a time of year of the position determination, and
      detecting an instantaneous temperature of the area, and
   wherein the map includes multiple map layers, including one map layer showing a map from a bird's-eye view, including a position of streets, buildings, and/or landscape features, a further map layer that includes a radar and/or LIDAR map of surroundings data values that are encompassed by the radar and/or LIDAR map being stored with a radar and/or LIDAR signature, and a surface-state map layer that includes surface states of a road.

2. The method as recited in claim 1, wherein the surface state in the area is in the form of friction coefficients and/or in a description of the surface state.

3. The method as recited in claim 1, wherein the providing of the map takes place so that vehicle and at least one other vehicle are operated as a function of the map.

4. The method as recited in claim 1, wherein the analysis of the position determination includes determining an intensity of a locating signal that is detected for determining a position of the vehicle.

5. A device for creating a map, comprising:
   a first element for receiving a signal representing a position determination of a vehicle in an area and including an analysis of the position determination;
   a second element for determining a surface state in the area based on the analysis and as a function of the position determination;
   a third element for creating a map based on the surface state, the map representing at least the area; and
   a fourth element for providing the map;
   wherein the determining of the surface includes at least one of:

performing a comparison of the analysis to at least one reference analysis, performing the comparison as a function of at least one of a time of day and a time of year of the position determination, and detecting an instantaneous temperature of the area, and wherein the map includes multiple map layers, including one map layer showing a map from a bird's-eye view, including a position of streets, buildings, and/or landscape features, a further map layer that includes a radar and/or LIDAR map of surroundings data values that are encompassed by the radar and/or LIDAR map being stored with a radar and/or LIDAR signature, and a surface-state map layer that includes surface states of a road.

6. The device as recited in claim 5, wherein the surface state in the area is in the form of friction coefficients and/or in a description of the surface state.

7. The device as recited in claim 5, wherein the providing of the map takes place so that the vehicle and at least one other vehicle are operated as a function of the map.

8. The method as recited in claim 5, wherein the analysis of the position determination includes determining an intensity of a locating signal that is detected for determining a position of the vehicle.

\* \* \* \* \*